Figure 1:
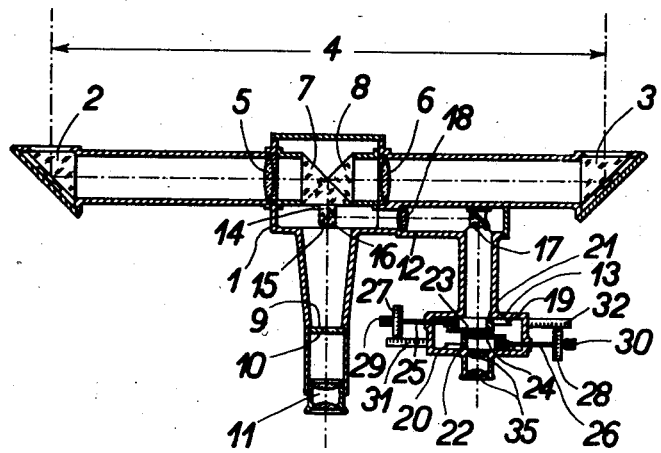

Inventor:
Robert Mechau

Patented Aug. 8, 1933

1,921,630

UNITED STATES PATENT OFFICE 1,921,630

METHOD AND INSTRUMENT FOR DETERMINING THE POSITION OF TARGETS EMITTING SHORT FLASHES OF LIGHT

Robert Mechau, Jena, Germany, assignor to Firm Carl Zeiss, Jena, Germany

Application August 8, 1931, Serial No. 555,930, and in Germany August 30, 1930

6 Claims. (Cl. 88—2.2)

I have filed an application in Germany, August 30, 1930, of which the following is a specification:

The method of finding the position of a target by determining its direction relatively to a known direction by means of a telescope and of finding its distance from this telescope by means of an optical rangefinder, is already known. The use of these instruments is generally made impossible at nightfall, when the illumination of the target the distance of which is to be measured is no longer strong enough to afford distinct images in the optical system of the instruments. In these circumstances a measurement can be effected only when the target itself emits light during a sufficiently long space of time. This case is however rather seldom in practice. Not so the special case in which, although the target emits light itself, the emission of light is so very short that it is over before the desired measurement can be carried through. For instance, the muzzle fire of the enemy's gun, which is visible only for the fraction of a second, will not suffice to direct a telescope exactly upon this gun and to adjust a rangefinder accordingly.

The invention, which aims at providing a way in which a measurement can be effected in this special case in spite of the said disadvantage, is based on the idea to equip optical systems which correspond to the said instruments with means retaining the image of the lighting up target at least for such a space of time as will suffice for the measurement. The direction of the target may be determined in the following manner. A layer of a light retaining substance is provided in the image plane of a telescope, and the telescope is coarsely directed upon the target. The lighting up of the target is observed in the telescope and the lateral deviation of the excited point on the said substance from a known direction is determined. This known direction is preferably represented by the axis of the entering imaging ray pencil or, should the construction of the telescope prevent this pencil from coinciding with the said axis, by the optical telescope axis. By means of the lateral distance of the said excited point from the point of intersection of the optical telescope axis and the layer and by means of the dimensional relations of the instrument the sought direction can be easily found. In case the distance of the target is known, also the position of the target can be deduced without difficulty, for instance in polar coordinates referring to the spot at which the telescope is mounted and to the direction of the magnetic needle of a compass. Contrary thereto, a photographic method will in most cases be of no avail in finding the direction of the flashing up target relative to a reference direction and this because the treatment of an exposed light-sensitive layer delays the evaluation of the found values.

Range measurements are based in most cases upon the determination of two directions or of the point of intersection of two directions. Accordingly, the new method can be used for the determination of the distance of a flashing up target also when applying two telescopes which, as explained hereinbefore, are constructed for finding the direction, when making the axes of the imaging ray pencils entering the telescope with a finite base difference parallel to each other, when coarsely directing these axes to the target, and when measuring on the said layer the lateral distance of the two points which are excited by the flashing up target. The measured value, the base difference and the dimensional relations of the instruments furnish the data required for calculating the sought difference. The position of the target can be correspondingly determined without difficulty also in polar coordinates.

When applying the new method for determining the direction, use may be made of any telescope which can be adjusted to great distances and has in the focal plane of the imaging system a layer carrier with a layer of light-retaining effect and a device for measuring the lateral distance of any point on the layer from a definite point on the same, preferably the point of intersection of the optical axis and the layer.

Suitable light-retaining substances of different light-sensitivities can be had anywhere. Tests have proved that with the most suitable substances the space of time within which the parts exposed to the lighting-up of the target fade away for the normal eye adapted to the dark is approximately one half minute. This period is quite sufficient for carefully carrying out a measurement. The very best material for the layer carrier is glass. That surface of the layer carrier which is covered with the layer is to be provided in the focal plane of the imaging system. The measuring process itself need not take place within the telescope; for the time which is required for the fading away of the light effect the layer carrier can be taken out and evaluated outside the telescope. In order to avoid parallax errors it eventually may be advisable to apply an additional imaging system which images the layer in the measuring plane of the measuring device. If the evaluation of the retained light effect takes place without altering the position of the layer carrier, a measurement can be effected in general in such a manner that the light-retaining layer is looked through in the sense of the telescope observation. The flashing up of the target causing a stronger effect on that surface of the layer which faces the target, it is advisable to look during the measuring process upon this side of the layer, which is easily possible when using a suitable mirror system placed in front of the layer carrier.

For carrying into effect the new method of determining the distance of a target use can be made of two telescopes adapted to find the direction, in which the axes of the entering imaging ray pencils are parallel to each other with a finite base difference and which are provided with an appliance for measuring lateral distances on the layer carriers; in other words, any double telescope may be used. However, owing to the slight base difference which the entering imaging ray pencils have in such telescopes, it is advisable to combine both single telescopes according to the rangefinders containing the basis and to use for instance one of the usual stereoscopical rangefinders.

When correctly applying the inventional idea the method can be carried into effect also by means of a variable-base rangefinder or a rangefinder having the basis in the target. The method is most simple when applying a rangefinder containing the basis for monocular use, in which the image planes of both imaging systems coincide, namely a rangefinder containing the basis in which a layer carrier provided with a light retaining layer is disposed in the common focal plane of the imaging systems. In this case it is essentially the same whether the rangefinder is a coincidence rangefinder, an invert rangefinder, or a rangefinder specially constructed for the present purpose which offers the view of the target and its surroundings in two images covering each other on the entire surface of the image field.

Figures 2, 3, 4:
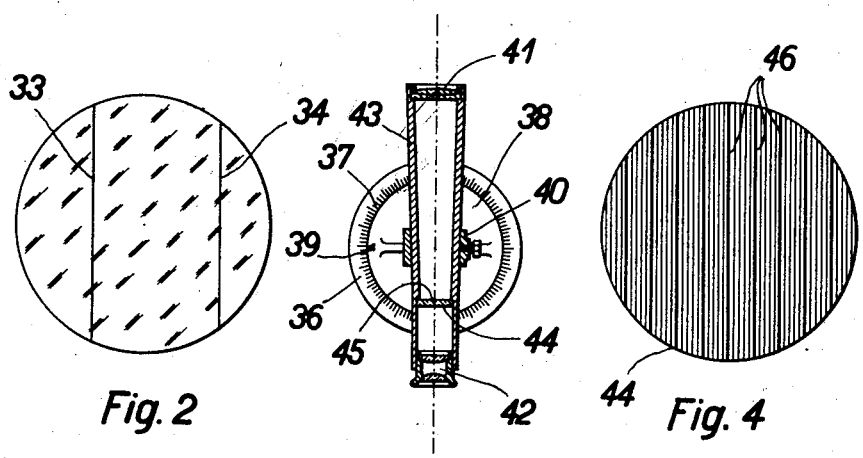

The annexed drawing illustrates two constructional examples of the invention. Figure 1 shows the first example, an instrument for determining the distance, in a central cross section and Figure 2 the image offered to the observer when looking into the measuring appliance. Figure 3 shows the second example, an instrument for determining the direction, in a central cross section and Figure 4 the image offered to the observer when looking into the measuring appliance according to this second example.

The first example (Figures 1 and 2) is similar to a coincidence rangefinder and has a tube 1 with two light entrance prisms 2, 3. The axes of the imaging ray pencils entering these prisms are parallel and their distance is the basis 4 of the instrument. Behind the prisms 2, 3 are inserted objectives 5, 6 which, by means of a ray collecting system of two rectangular isosceles prisms 7, 8 image distant objects on that surface, 9, of a plano-parallel glass plate 10 which faces them and, accordingly, is the rear focal plane of both objectives, whereby the images projected by the two objectives 5 and 6 cover each other on the entire surface 9. The surface 9 is lined with a thin layer of a light retaining substance and lies in the front focal plane of a two-lens ocular 11 which is inserted behind the glass plate 10.

On the tube 1 is cast a second tube 12 which is rectangularly curved and ends in a box-like extension 13. To the ray collecting systems 7, 8 is cemented a prism 14 whose surface 15, which is inclined by 45°, faces the glass plate 10. On the surface 15 is also cemented a rectangular isosceles prism 16 the cemented surface of which is semi-transparently silvered. This prism corresponds to an equal reflecting prism 17 provided within the curvature of the tube 12. In this tube 12, between the two prisms 16 and 17, is disposed a collecting system 18. The box-like extension 13 contains two slide guides 19, 20 which are provided with frame-like slides 21 and 22, respectively. The slides 21, 22 contain plano-parallel glass plates 23, 24. In the slides 21, 22 are rotatably mounted threaded spindles 25 and 26, respectively, which mesh with corresponding interior threads cut into the walls of the box-like extension 13 and have at their ends divided discs 27 and 28, respectively, and milled heads 29 and 30, respectively. The divisions on the discs 27, 28 indicate the longitudinal displacements of the spindles 25, 26, which correspond to the respective turning angles. To the divided plates 27, 28 belong scales 31 and 32 respectively, which are fixed to the walls of the box-like extension 13 and have a coarse longitudinal division. Those surfaces of the glass plates 23, 24 which face each other are only at a very short distance from each other and carry line marks 33 and 34 respectively, both of which consequently lie nearly in one plane which at the same time is the rear focal plane of a two-lens ocular 35.

If the instrument should be used for instance for finding at night the distance of a firing gun, the light entrance surfaces of the prisms 2 and 3 are so directed that they approximately face the target, that is to say in such a manner that, provided the muzzle fire is sufficiently intensive, the objectives 5 and 6 image the target on the surface 9 of the glass plate 10. At the moment of firing, the muzzle fire of the gun becomes visible and is imaged on the surface 9 as two luminous points lying in a horizontal line. The light rays emanating from the muzzle fire excite the corresponding points on the layer on the surface 9 which retain the light effect for a certain time. The imaging rays are reflected twice, on the reflecting surfaces of the prism 16 and on that of the prism 17, whereupon the collecting system 18 images the surface 9 on those surfaces of the glass plates 23, 24 which face each other, so that, by means of the ocular 35, also the luminous points on the layer can be viewed. The observer now turns the spindles 25, 26 by means of the milled heads 29, 30 and displaces the slide 21, 22 with the glass plates 23, 24 until each of the lines 33 covers in the field of view one of the images of the luminous points on the layer. When this is achieved, the lateral distance of these two images can be found by adding the values which are coarsely indicated on the scales 31, 32 and those which are finely indicated on the divided discs 27, 28. Thereupon the obtained value is reduced to the sought distance of the target, whereby the length of the basis 4 and the imaging scale of the instrument must be taken into consideration.

The second example (Figures 3 and 4) shows a plate 38 which has an angular division 37 and is rotatable relatively to a divided circle 36. This plate 38 is provided with an index 39 co-acting with the division 37 and a bearing 40 supporting a telescope tube 43 containing an objective 41 and a two-lens ocular 42. In the rear focal plane of the objective 42 is provided a plano-parallel glass plate 44. The surface 45 of this plate 44, which faces the objective, is provided with a layer of a light retaining substance and with an longitudinal division 46 of vertical lines.

In order to find with the instrument at night the direction of a firing gun, referring to any known direction, the telescope is directed into the known direction by turning the plate 38 and the target is aimed at approximately. In both positions the angular value of the direction is read by means of the index 39 on the scale 37. Now the flash of the muzzle fire of the gun is observed in the ocular 42 and the lateral distance of the point which the flash excites on the light retaining layer on the glass plate 44 is determined by means of the scale 46 for instance relatively to the medial division line going through the point of intersection of the optical telescope axis and the said layer. The read values and the dimensional relations of the telescope afford an easy determination of the sought direction.

I claim:

1. A method of determining the direction of targets emitting short flashes of light, consisting therein that a light-retaining substance is provided in the image plane of a telescope, that the telescope is approximately directed upon the target, and that, finally, the lateral deviation of that point on the layer which is excited by the flashing-up of the target from a known direction, preferably from the direction of the telescope, is measured.

2. A method of determining the distance of targets emitting short flashes of light, consisting therein that layers of a light retaining substance are provided in the image plane of two telescopes, that the axes of the telescopes are made parallel to each other and directed approximately upon the target and, finally, that the lateral distance of those two points on the light retaining layers which are excited by the flashing up of the target is measured.

3. An instrument for determining the direction of targets emitting short flashes of light, comprising a telescope, a layer carrier with a layer of a light retaining substance being provided in the image plane of the telescope, a device for measuring the lateral distance of any point on the layer from a definite point on this layer, preferably from the point of intersection of the optical telescope axis and the layer, the said device being provided in the telescope.

4. An instrument for determining the distance of targets emitting short flashes of light, comprising two telescopes the axes of which are parallel to each other, a layer carrier with a layer of a light retaining substance being provided in the image plane of each of these two telescopes, a device being provided in the instrument, this device being suited to measure lateral distances.

5. In an instrument according to claim 4, the two telescopes being combined in a rangefinder containing the basis.

6. In a rangefinder containing the basis, two telescopes being rigidly connected with each other, an ocular common to the two telescopes, a layer carrier with a layer of a light retaining substance being provided in the image plane of the ocular, the rangefinder comprising further a device for measuring lateral distances on the layer carrier.

ROBERT MECHAU.